United States Patent
Anicic et al.

(10) Patent No.: US 11,023,211 B2
(45) Date of Patent: Jun. 1, 2021

(54) METHODS FOR GENERATING A SEMANTIC DESCRIPTION OF A COMPOSITE INTERACTION

(71) Applicants: Darko Anicic, Munich (DE); Aparna Saisree Thuluva, Munich (DE)

(72) Inventors: Darko Anicic, Munich (DE); Aparna Saisree Thuluva, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/815,274

(22) Filed: Mar. 11, 2020

(65) Prior Publication Data

US 2020/0301675 A1  Sep. 24, 2020

(30) Foreign Application Priority Data

Mar. 18, 2019 (EP) ..................... 19163492

(51) Int. Cl.
 G06F 9/44 (2018.01)
 G06F 8/20 (2018.01)
 G06F 40/30 (2020.01)
 G06F 3/0486 (2013.01)
 G06F 8/34 (2018.01)
 G06F 8/38 (2018.01)

(52) U.S. Cl.
 CPC .............. G06F 8/20 (2013.01); G06F 3/0486 (2013.01); G06F 8/34 (2013.01); G06F 8/38 (2013.01); G06F 40/30 (2020.01)

(58) Field of Classification Search
 CPC .......... G06F 8/20; G06F 40/30; G06F 3/0486; G06F 8/34; G06F 8/38

USPC ....................................................... 717/121
 See application file for complete search history.

(56) References Cited

U.S. PATENT DOCUMENTS

2016/0026631 A1  1/2016  Salam
2021/0042635 A1*  2/2021  Li .......................... G06F 16/367

FOREIGN PATENT DOCUMENTS

WO  WO2016128415 A1  8/2016

OTHER PUBLICATIONS

European Search Report for European Application No. 19163492. 2-1216 dated Jul. 29, 2019.

(Continued)

*Primary Examiner* — Chuck O Kendall
(74) *Attorney, Agent, or Firm* — Lempia Summerfield Katz LLC

(57) ABSTRACT

The embodiments proposed herein provide a simplified configuration of an industrial entity and an application design development using a visual programming environment. The concept is based on graphical representation of semantic models as configurable entity icons. An entity icon corresponding to a semantic configuration template acts as a template for an atomic capability of an industrial entity providing a configuration that is consistent with preconfigured solutions of the semantic model. The entity icon may be customized according to a device specification of the industrial entity by configuring one or more attributes according to the device specifications. The configuration act is guided and validated. One or more configured entity icons may be used to describe capabilities of an industrial entity or to create an IoT application template.

7 Claims, 7 Drawing Sheets

(56) References Cited

OTHER PUBLICATIONS

Mainetti, Luca, et al. "A novel rule-based semantic architecture for IoT building automation systems." 2015 23rd International Conference on Software, Telecommunications and Computer Networks (SoftCOM). IEEE, 2015. pp. 1-8.

Pathan, Mukaddim, Kerry Taylor, and Michael Compton. "Semantics-based Plug-and-Play Configuration of Sensor Network Services." SSN 10 (2010): 17-32.

* cited by examiner

METHODS FOR GENERATING A SEMANTIC DESCRIPTION OF A COMPOSITE INTERACTION

The present patent document claims the benefit of European Patent Application No. 19163492.2, filed Mar. 18, 2019, which is hereby incorporated by reference.

TECHNICAL FIELD

The disclosed embodiments relate to method for generating a semantic description of a composite interaction in order to define a functionality of at least one industrial entity.

BACKGROUND

The evolvement of networking between computers and computing devices has eventually led to a so-called »Internet of Things«. Internet of Things in an industrial context means a concept which functionally connects Things—or industrial entities—in order to achieve a composite interaction, e.g., for tracking, monitoring, and management of a more complex industrial entity. Industrial entities may vary in terms of complexity, ranging from single sensors, devices, equipment, systems, sub-systems, or eventually complete processes in an industrial environment.

In order to control interactions amongst industrial entities, a vivid concept of a »digital twin« has been introduced by which physical capabilities of the industrial entity are expressed using a machine-readable and -influenceable description—digital twin—of the industrial entity. The digital twin of an industrial entity may be based on well-defined semantic models for describing properties, interactions, and/or events of an industrial entity in a platform-agnostic, format-neutral, and consistent format.

Currently applied methods for developing an application using a composite interaction of a plurality of distributed industrial entities may be based on configuring the semantic models and coding semantically expressed interactions in and by the semantic models. The development, however, requires both, semantic expertise for understanding and using semantic descriptions, and process skills of the specific industrial environment. Consequently, the development of such applications is challenging for an application developer without special expertise in semantics.

Accordingly, there is a need in the art for a development of composite interactions—and, eventually, applications—which is severed from the burden of understanding and coding semantically expressed models.

Further on, there is a need in the art for re-using existing semantic models for configuration purposes in alternative environments, enabling amendments without needing to understand or re-code the underlying semantic models.

Still further, there is a need in the art for supporting the process of developing a composite interaction by automatically discovering compatible interactions which are possibly suitable for development in progress.

SUMMARY AND DESCRIPTION

The scope of the present disclosure is defined solely by the appended claims and is not affected to any degree by the statements within this summary. The present embodiments may obviate one or more of the drawbacks or limitations in the related art.

The present disclosure relates to a method for generating a semantic description of a composite interaction. The method includes storing a plurality of semantic configuration templates in an industrial knowledge graph, each configuration template semantically representing at least one interaction. The method further includes loading, by a composition unit, at least one semantic configuration template as an entity icon corresponding to the semantic configuration template, parsing at least one semantically expressed interaction of the at least one semantic configuration template and providing access to the at least one semantically expressed interaction by at least one interconnectable node assigned to the entity icon. The method further includes assembling, in the composition unit, a data flow diagram by interconnecting, in response to user input, at least two interconnectable nodes to define the composite interaction. The method further includes interpreting, by a semantic reasoner, a semantic expression of the composite interaction, performing a semantic discovery of functional requirements of the composite interaction amongst a plurality of semantic descriptions of industrial entities in the industrial knowledge graph, identifying at least one semantically similar semantic description and providing, in response to user input, the at least one semantically similar semantic description as at least one entity icon corresponding to the semantically similar semantic description. The method further includes transforming the flow chart including the entity icons and the interconnected nodes into a semantical representation of the composite interaction to form the semantic description of the composite interaction. The method further includes storing the semantic description of the composite interaction in the industrial knowledge graph.

The proposed embodiments suggest a composition unit, which is capable of representing semantic models of industrial entities by respective entity icons. Relying on the stringent semantic and syntactic structure of semantic configuration templates, which are itself a kind of semantic description, a parsing unit is applied to identify one or more semantically expressed interactions of the semantic configuration template and providing access to a respective interaction by at least one interconnectable node assigned to the entity icon. Interaction may include actions, events, and properties which the semantic configuration templates provide.

A composite interaction is defined by intuitively assembling a data flow by interconnecting nodes of one or more entity icons in response to user input. Consecutively, this flow chart (including its entity icons and interconnected nodes) is transformed into a semantical representation to form the semantic description of the composite interaction between the one or more involved industrial entities. The semantic description of the composite interaction is then stored in an industrial knowledge graph. A knowledge graph is a semantic repository wherein the knowledge saved therein is organized in a graph structure. This organization makes knowledge graphs especially efficient for discovery operations.

A knowledge graph connects things of different types in a systematic way. Knowledge graphs encode knowledge arranged in a network of nodes and links rather than tables of rows and columns. By that, machines benefit from a dynamically growing semantic network of facts about things and may use it for data integration, knowledge discovery, and in-depth analysis.

The proposed embodiments further provide discovering already existing semantic descriptions by a semantic reasoner with the purpose of re-using already configured semantic descriptions of industrial entities. Out of the plurality of already existing semantic descriptions of industrial entities, semantically similar descriptions are of particular interest for complementing a yet missing but desired interaction in the context of generating the composite interaction. To this end, a semantic reasoner is interpreting functional requirements of the present (prematurely developed) composite interaction and inferring one or more suitable interactions which would fit (apart from some necessary adaption in the configuration of attributes) into the functional needs of the composite interaction to be developed. Thereby, semantic discovery techniques are used to resolve semantic similarities amongst the plurality of semantic descriptions.

Optionally, information retrieval techniques are used to resolve the semantic similarities. For example, concepts used in an industrial domain and the relationships among them are modelled in an industrial domain ontology. An ontological similarity of the semantic annotations associated with an interaction description is derived by inferring the domain ontology. The at least one semantic description of at least one industrial entity is then provided as at least one entity icon corresponding to the semantic description as retrieved and selected by a user. A further configuration is optionally optimized throughout an inference procedure of the reasoner.

Applying the embodiments, a non-expert in the field of semantic descriptions may easily use the semantic models to develop a digital twin semantics in a machine interpretable format. Advantageously, the development of a composite interaction according to the embodiments does neither require understanding nor coding semantically expressed models. Moreover, the concept also enables the validation of the configuration process.

The proposed embodiments advantageously provide a semantic-driven ecosystem which enables a non-semantic expert to use semantic definitions for developing semantically structured, interoperable interactions, which are directly usable for defining interoperable industrial applications. The proposed embodiments thereby significantly reduce time and effort required for an industrial application development.

BRIEF DESCRIPTION OF THE DRAWINGS

The objects as well as further advantages of the present disclosure will become more apparent and readily appreciated from the following description of the exemplary embodiments, taken in conjunction with the accompanying drawings of which.

DETAILED DESCRIPTION

The vision of an Industrial Internet of Things (IIoT) is to digitalize industrial facilities and offer new classes of applications that are based on this digitalization. In this regard, various sensors and actuators are attached to industrial entities in order to sense and interact with the physical environment.

A digital twin assigned to an industrial entity expresses physical capabilities of the industrial entity by a machine-readable and -influenceable description of the industrial entity. The digital twin of an industrial entity is commonly based on well-defined semantic descriptions in a platform-agnostic, format-neutral and consistent format. Such semantic descriptions may be expressed by OPC-UA standards, or by model referred to as »iot.schema.org«. OPC UA (Open Platform Communications Unified Architecture) is an industrial standard protocol of the OPC Foundation for manufacturer-independent communication with the purpose of inter-changing industrial data, in particular in process automation. iot.schema.org models include a set of extensible schemas for structured data supporting semantic interoperability for connected things across diverse IoT systems.

Semantic descriptions, however, require a semantic expertise so that their development and even their configuration may be challenging for application engineers who are not experts in the field of semantic descriptions.

A basis of an application is a development of a composite interaction. Hereinafter, a composite interaction is understood as an interaction made of independent and/or dependent atomic interactions for defining activities or tasks participating to at least one process and generating a workflow, e.g., a set of ordered activities depending one from the other and being executed in an organized or orchestrated manner in order to produce a desired result.

The present embodiments provide a development platform in which a development and configuration of semantic descriptions is intuitively compiled by providing entity icons as a graphical representation of a semantic description, wherein composite interactions are defined by a workflow. Further on, attributes to be emended for configuration are accessed to a user input rather than by querying and amending code lines of the semantic description.

Using entity icons and visually defining a workflow for connecting nodes representing an interaction between entity icons allows application engineers to easily create composite interactions, without having a detailed expertise of the complex structure of the semantic descriptions.

Figure 1:
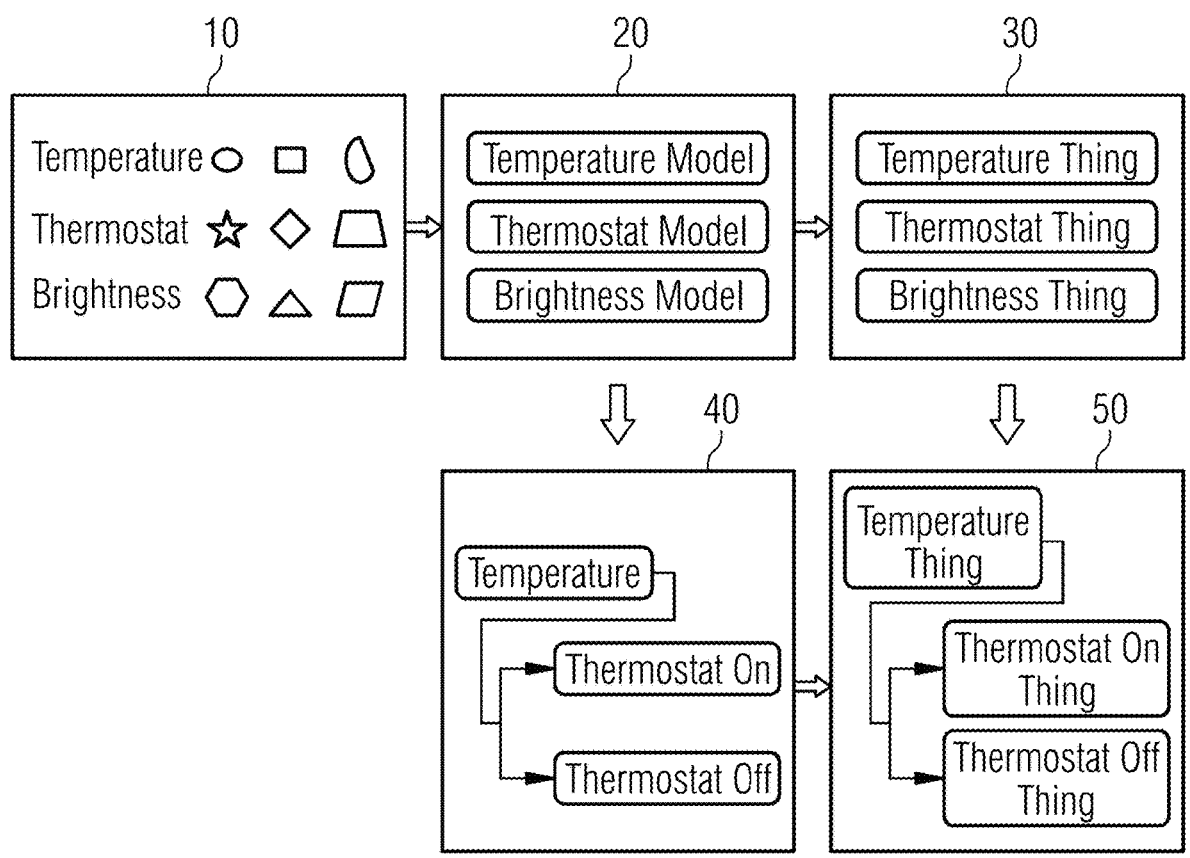
FIG. 1 depicts a block diagram of possible stages in the development of an industrial application according to several embodiments.

FIG. 1 shows a block diagram of possible stages in the development of an industrial application. Formally unstructured data 10, (e.g., a temperature value, a thermostat entity, or a brightness value), are unstructured in terms of a semantic heterogeneity, that is, different names are used to represent a same thing, or a same name is used to represent different things, resulting in an ambiguous description of things and hindering discoverability of things for application development.

According to an embodiment, these unstructured data 10 are structured by graphical configuration templates 20, accordingly shown as a configuration template of a Temperature Model, a configuration template of a Thermostat Model and a configuration template of a Brightness Model. The configuration templates 20 are provided to graphically configure an industrial entity according to a semantic model.

These configuration templates may be instantiated to execute composite interactions between industrial entities, across diverse domains, vendors and platforms. Moreover, the same graphical configuration templates may be used to design application templates 40. According to an embodiment, a design and development of applications is realized with graphical components, hereinafter also referred to as entity icons. The configuration templates may be instantiated to execute composite interactions between industrial entities, across diverse domains, vendors and platforms.

Distinct advantages of these configuration templates 20 are given by the fact that they are automatically generated from semantic models and that they are interpretable by semantic reasoners. The interpretability by semantic reasoners provides further distinguishing advantages in the discovery of suitable configuration templates by performing a semantic discovery, identifying semantically similar semantic descriptions, and providing entity icons corresponding to the semantically similar semantic description. Furthermore, the embodiments may assist a user to automatically instantiate the application template on existing physical assets.

Referring back to an exemplary use case as shown in FIG. 1, a system is considered wherein a temperature sensor includes an integrated thermostat. A device vendor aiming to configure the semantics of the devices in a machine interpretable format is using graphical configuration templates 20, (here a Temperature Model and a Thermostat Model), configuring these templates, and eventually generating a semantic description of the industrial entities, a Temperature Thing and a Thermostat Thing as shown in box 30 of FIG. 1 representing a collection of Configured Things 30.

For additionally creating an IoT application 50, such as controlling the thermostat based on the temperature measurement in the room, an application engineer may use the graphical configuration templates 40, configure the entity icons and connect their interactions, eventually creating a machine interpretable IoT application template 40.

Dependent on a chosen semantic model, interactions may be expressed in different ways. The model according to iot.schema.org describes functionality of a class of Things in terms of capability, interaction patterns, and data schema they offer. Interactions are referred to as interaction patterns in iot.schema.org and include actions, events, and properties which a thing provides. These are called Interaction Patterns as one may interact with a thing throughout them, e.g., to read a property of a thing, to trigger its actions, or to consume an event raised by the thing.

Further on, iot.schema.org also specifies a data schema of interaction patterns. That is, it specifies data consumed and/or produced by an interaction pattern of a thing in terms of value type of the data, the data range (e.g., minimum and maximum values), unit of measurement, allowed values, etc. An interaction pattern with its data schema is an atomic interaction, also referred to as atomic capability or skill of a thing. Nevertheless, the concept of interactions may be realized using alternative standardized semantic models, e.g., OPC-UA companion specifications, or other domain specific semantic models and/or ontologies. Such companion specifications are used to define domain-specific semantic models or schemas extending the Open Platform Communications Unified Architecture (OPC-UA) model.

Referring back to the exemplary use case wherein a temperature sensor includes an integrated thermostat, the semantic model of the temperature sensor is now described in an example application. The exemplary temperature sensor provides the current temperature measurement in a room. This temperature sensor is semantically described by schema according to iot.schema.org in terms of a capability entitled »TemperatureSensing«. This capability provides a property entitled »Temperature«. The definition of iot.schema.org for »Temperature« property is shown below.

```
iotsh:TemperatureDataShape a sh:NodeShape ;
  sh:targetClass iot:TemperatureData ;
  sh:and (
  [ sh:property [
    sh:path schema:propertyType ;
    sh:minCount 1 ;
    sh:maxCount 1 ;
    sh:datatype xsd:float ; ]; ]
  [ sh:property [
    sh:path schema:minValue ;
    sh:minCount 1 ;
    sh:maxCount 1 ;
    sh:datatype xsd:float ; ]; ]
  [ sh:property [
    sh:path schema:maxValue ;
    sh:minCount 1 ;
    sh:maxCount 1 ;
    sh:datatvne xsd:float ; ]; ]
  [ sh:property [
    sh:path schema:unitCode ;
    sh:minCount 1 ;
    sh:maxCount 1 ;
    sh:in ( iot:Celsius iot:Fahrenheit iot:Kelvin ) ; ]; ] ).
iotsh:TemperatureShape a sh:NodeShane ;
  sh:targetClass iot:Temperature ;
  sh:and (
  [ sh:property [
    sh:path iot:providesOutputData ;
    sh:minCount 1 ;
    sh:maxCount 1 ;
    sh:node iot:TemperatureData ; ]; ] ).
```

The definition of the »Temperature« property is described in a Resource Description Framework or RDF shape format called SHACL, or Shape Constraints Language. Alternatively, other languages for describing the semantics may be used, e.g., Shape Expressions Language or ShEx provided for a description of RDF (Resource Description Framework) graph structures or OWL axioms according to Web Ontology Language etc.

The »Temperature« property provides an output data entitled »TemperatureData«. The schema iot.schema.org stipulates the data type of this output data »TemperatureData« to be provided by a value type float. Moreover, a range, e.g., a minimum and a maximum value of this output data »TemperatureData« are to be specified, each by a value type float. Further on, the unit of measurement of Temperature is to be specified to »DegreeCelsius«, »Kelvin«, or »Fahrenheit«. As detailed hereinafter, a data schema will be part of an interaction pattern which will be represented as an entity icon, e.g., a graphical and configurable template according to the embodiments. These Entity icons are automatically generated from the semantic models. In order to configure the capabilities of an industrial entity, a user is able to discover required entity icons and to configure them according to the device specifications.

Figure 2:
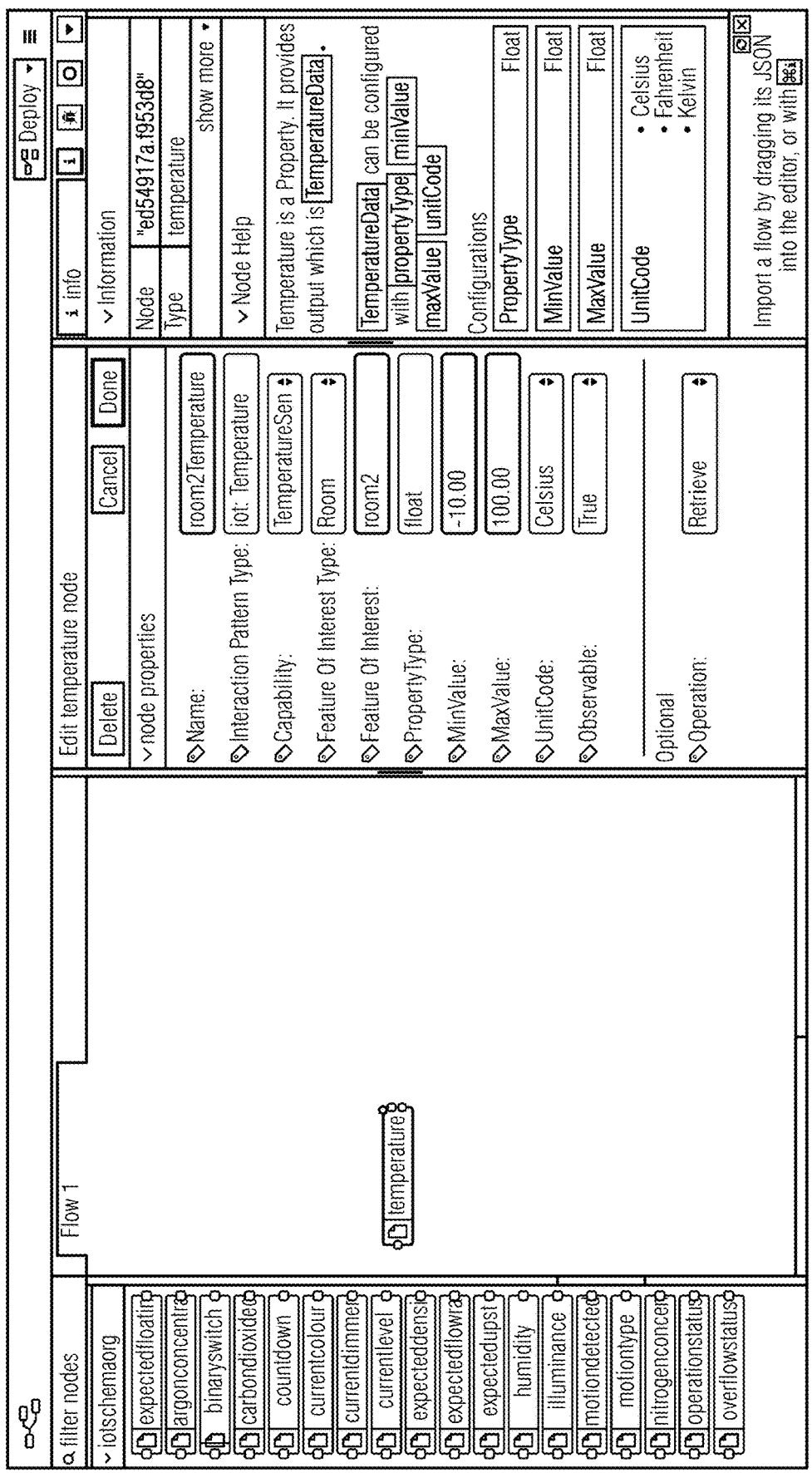
FIG. 2 depicts a graphical representation of an example of a composition unit, wherein an entity icon corresponding to a semantic configuration template is configured.

FIG. 2 shows such an entity icon entitled »temperature« corresponding to the semantic configuration template of the »Temperature« property along with a list of configuration attributes for configuring the temperature property. These attributes may be parameterized to configure the temperature property of a thing. The output of the configured nodes is a configuration file that may be used to generate semantic description of a thing for an IoT ecosystem.

FIG. 2 shows a possible graphical user interface (also referred to as composition panel) of a composition unit according to the embodiments. The composition panel visualizes a composition of entity icons. In the present stage as depicted by FIG. 2, this composition panel, here entitled by »Flow 1«, solely contains and depicts the entity icon »temperature«. Another panel entitled »filter nodes« on the left side to this composition panel provides more entity icons for selection (by way of a drag-and-drop operation) by a user. A configuration panel on the right side to this composition panel (which is here entitled »Edit temperature node« due to a user's selection of the entity icon »temperature«) provides one or more control elements for accessing attributes of this selected entity icon for providing user input by the control elements, (e.g., input boxes, pull down menus, etc.), in order to configure attributes the selected entity icons.

There are several attributes (in the drawing referred to as node properties) for configuring the interaction pattern and its data. The attributes include:
- »Capability« for expressing a capability or skill of the corresponding physical thing;
- »Feature of Interest Type«: the type of industrial entity whose quantity is being observed or actuated. Attributes like a room, a tank, a door etc. may be assigned;
- »Feature of Interest«: an industrial entity instance, whose quantity is being observed or actuated. Attributes like a room 1, tank 2 etc. may be assigned;
- »MinValue«: if applicable, minimum scale of a quantity being observed or actuated by a thing's interaction may be configured;
- »MaxValue«: if applicable, maximum scale of a quantity being observed or actuated by a thing's interaction may be configured.
- »UnitCode«: if applicable, unit of measurement of a quantity being observed or actuated by a thing's interaction may be configured.

Entity icons corresponding to the semantic configuration template are basic building blocks of the embodiments for configuring a digital twin according to device specifications of the corresponding industrial entity. Moreover, an IoT application may also be easily designed and developed using these entity icons as described further down below.

One of the possible outputs of the entity icon as configured according to FIG. 2 is a semantic configuration template of the industrial entity, (e.g., the temperature sensor), including constraints as configured above using configuration attributes for the interaction pattern of the industrial entity. The listing below shows a snippet of the semantic configuration template specified by a SHACL shape:

```
iotsh:TemperatureDataShape a sh:NodeShape ;
    sh:targetClass iot:TemperatureData ;
    sh:and (
        [ sh:property [
            sh:path schema:propertyType ;
        sh:datatype xsd:float ;
            sh:minInclusive 0.0 ;
            sh:maxInclusive 100.0 ; ]; ]
        [ sh:property [
            sh:path schema:unitCode ;
            sh:hasValue iot:Celsius ; ]; ] ).
    iotsh:TemperatureShape a sh:NodeShape ;
        sh:targetClass iot:Temperature ;
```

-continued

```
        strand (
        [ sh:property [
            sh:path iot:providesOutputData ;
            sh:minCount 1 ;
            sh:maxCount 1 ;
            sh:node iot:TemperatureData ; ]; ] ).
```

The semantic configuration template includes the configurations customized according to a vendor specification for the exemplary temperature sensor. According to the semantic description, the temperature sensor provides temperature data by a data type float within a temperature range from 0.00 to 100.00 degrees Celsius.

The semantic configuration template of this industrial entity may be used to generate a semantic description of the industrial entity for a specific ecosystem such as: a »Web of Things Thing Description« or TD according to specifications of the World Wide Web Consortium or W3C; an OPC UA node set according to specifications of the Open Platform Communications Unified Architecture; or cloud data models such as the MindSphere Asset model.

Figure 3:
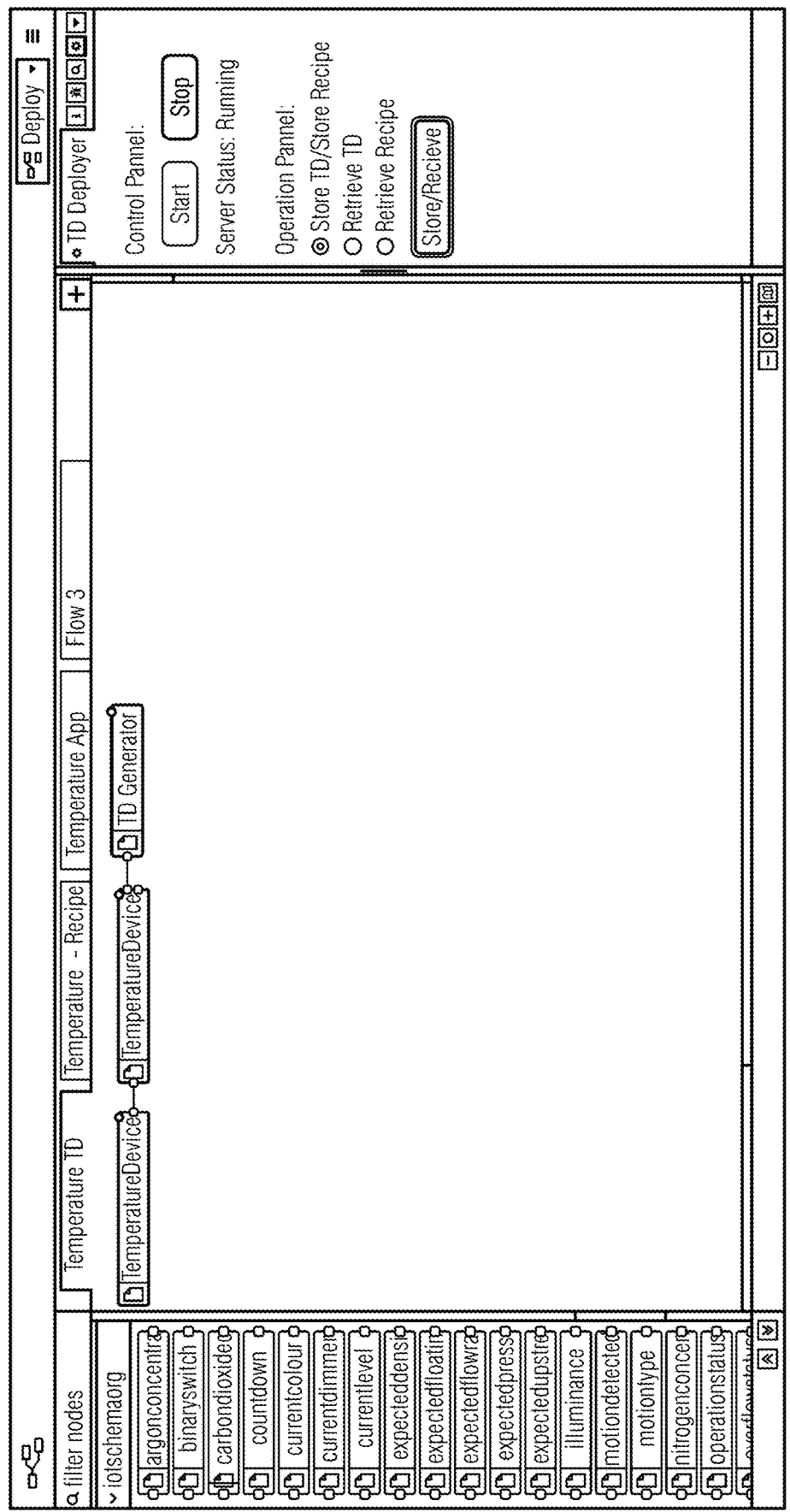
FIG. 3 depicts a graphical representation of an example of the composition unit in a second stage of development, wherein a Thing Description is generated from an entity icon corresponding to a semantic configuration template.

FIG. 3 shows a composition panel of the composition unit in a further stage of development, wherein an entity icon of the industrial entity »TemperatureDevice« is connected to an entity icon »TD generator«—Thing Description Generator—in order to generate a semantic description of the industrial entity, the exemplary temperature device.

The entity icon »TD generator« generates a Thing Description with semantic mark-ups from iot.schema.org using the configured industrial entity as input. The user is able to configure information about the industrial entity such as the base Uniform Resource Identifier (URI) by which the industrial entity may be accessed and/or name and security meta data of the industrial entity. Then the entity icon »TD generator« generates a semantically enriched Thing Description as output.

The semantic description may be stored in a semantic repository, such as an industrial knowledge graph for efficient discovery or a Thing Directory which is a triple store with RESTful interface provided by the Web of Things interest group of the World Wide Web Consortium (W3C). The term RESTful refers to a distributed web services scheme also known in the art as »Representational State Transfer« or REST. This REST scheme is stateless, e.g., between two communicating partners no status information are stored between two REST messages. Web services that conform to the REST schema are also called RESTful. In order to implement web services, request schemes are used which are already defined in the HTTP transmission protocol, for example the well-known request schemes GET, POST, PUT/PATCH, or DELETE.

In the following section, an integration of »Brownfield Devices« is described. The term »brownfield device« (as opposed to a »greenfield device« supporting a semantically operable IoT standard) refers to a state-of-the-art industrial device operated by a legacy description language which is to be deployed in a contemporary IoT environment, or communicating over a protocol, which is not known to the rest of a system or application. There are several device description languages implemented on brownfield devices which need to be integrated into a semantic IoT environment. It is an object of the proposed embodiments to support an integration of brownfield devices operated by such legacy description languages of any kind. The embodiments support »semantification« of brownfield devices by an integration with standardized semantics.

This integration is dependent on the capabilities of the brownfield device. For example, if a brownfield device provides a web interface, then the device may be accessed, and it may be represented as a graphical node as detailed hereinafter. Further, if a brownfield device has no web interface, existing standards such as W3C Web of Things or OPC-UA, etc., may be used to realize a gateway in a first act. In a subsequent act, the present embodiments are applied to integrate heterogenous brownfield devices via the gateway with standardized semantics.

Figure 4:
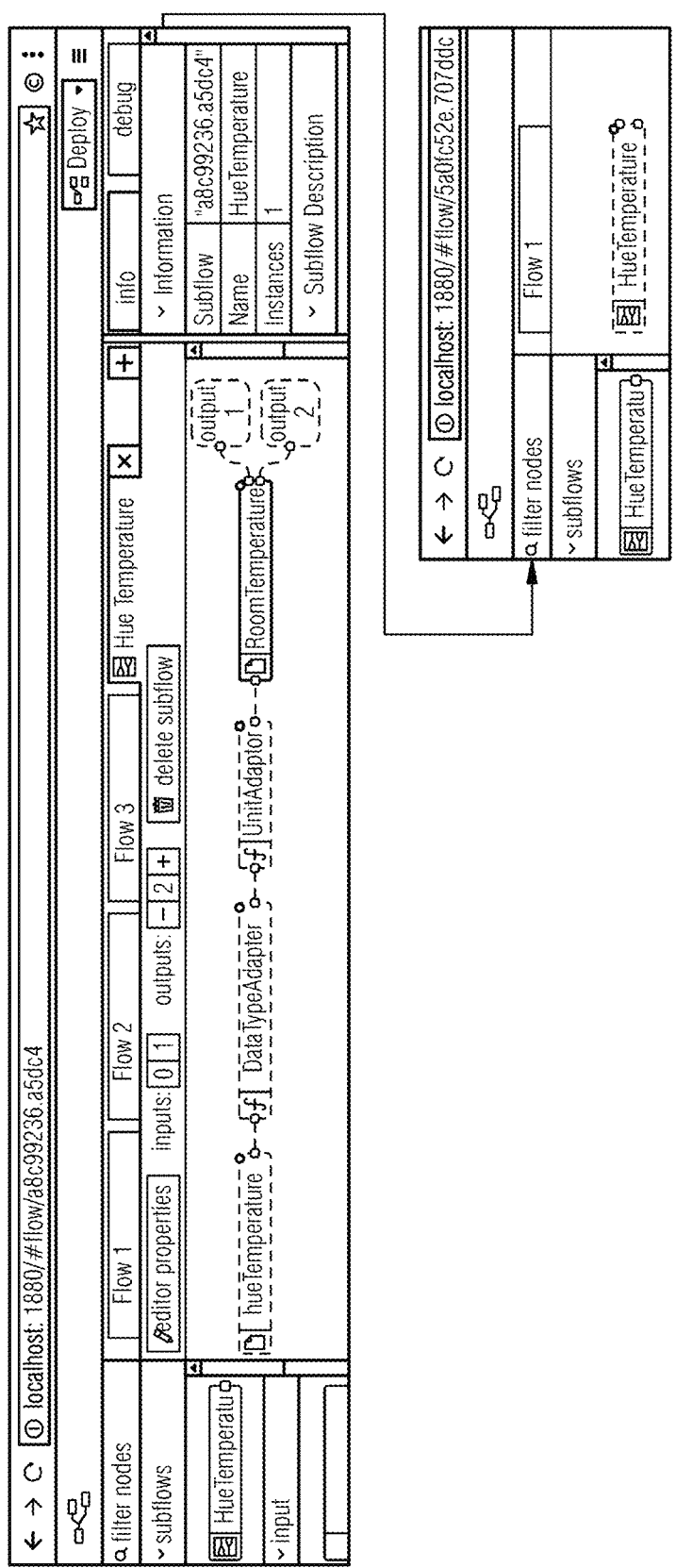
FIG. 4 depicts a graphical representation of an example of the composition unit in a third stage of development, wherein an entity icon representing a brownfield industrial device is configured.

FIG. 4 shows a graphical interface of the composition unit, wherein an entity icon »hueTemperature« is modelling a brownfield device to be integrated. In a preceding act, an entity icon according to a similar configuration template is discovered by a semantic search which is then selected. The selected entity icon »hueTemperature« is then adjusted and configured with parameters according to the specification of the desired brownfield device.

The configuration is configured to the device specification which is embodied by an entity icon »RoomTemperature« as shown in FIG. 4. After that, both entity icons are connected. As shown in FIG. 4, the connection between the entity icons »hueTemperature« and »RoomTemperature« is not a direct connection and includes two further entity icons, namely a »DataTypeAdapter« and a »UnitAdapter«. This is for the reason that some brownfield device (as in the exemplary use case) require one or more adaptations to make an existing brownfield device data set compliant with a corresponding iot.schema.org specification as provided by the corresponding semantic description of the entity icon »RoomTemperature«.

Especially, the input or output data schema of an industrial entity is to be adopted. In the exemplary case, a value type, encoding format, unit of measurement of data of the entity icon »hueTemperature« is to be adopted because it outputs a temperature value with a data type integer while the temperature interaction pattern embodied by the entity icon »RoomTemperature« prescribes the temperature data has to be of a data type float. Accordingly, the data types of the brown field device do not match with the semantic template. The entity icon »DataTypeAdapter« provides an adaptation between these data types. Adapting entity icons may be provided to adopt the semantics of a device as prescribed by a semantic template.

A further adapting entity »UnitAdapter« as shown in FIG. 4 adapts an output temperature in a unit of degrees Fahrenheit to a required unit of Kelvin. Further adapting entities may be provided to convert data from integer to float or from float to double, data in string format to JSON or vice versa, or data from one unit of measurement to another.

In the following, an embodiment for generating a semantic description of a composite interaction is described, which is eventually capable of designing an IoT application. Again, the exemplary case is considered with the aim of controlling the exemplary thermostat based on the temperature measured by the temperature sensor. A composite interaction is designed by orchestrating required industrial entities which means (for their digital twins) an orchestration of one or more data flows interconnecting interactions of data entities corresponding to semantic configuration templates. In order to design a composite interaction, the following acts are made. In one act, a semantic discovery is performed of functional requirements of the composite interaction amongst a plurality of semantic descriptions of industrial entities in the industrial knowledge graph. In an optional act, the templates may be configured in order to describe the requirements of the composite interaction. This may include a specification of a type of interaction pattern an industrial entity may possess. In another act, a data flow diagram is assembled by interconnecting at least two interconnectable nodes of entity icons to define the composite interaction. In another act, the flow chart including the entity icons and the interconnected nodes is transformed into a semantical representation of the composite interaction to form the semantic description of the composite interaction. The resulting composite interaction is an application template which may be stored in the semantic repository (or industrial knowledge graph) for discovery and re-use or which may be instantiated as an application.

Figure 7:
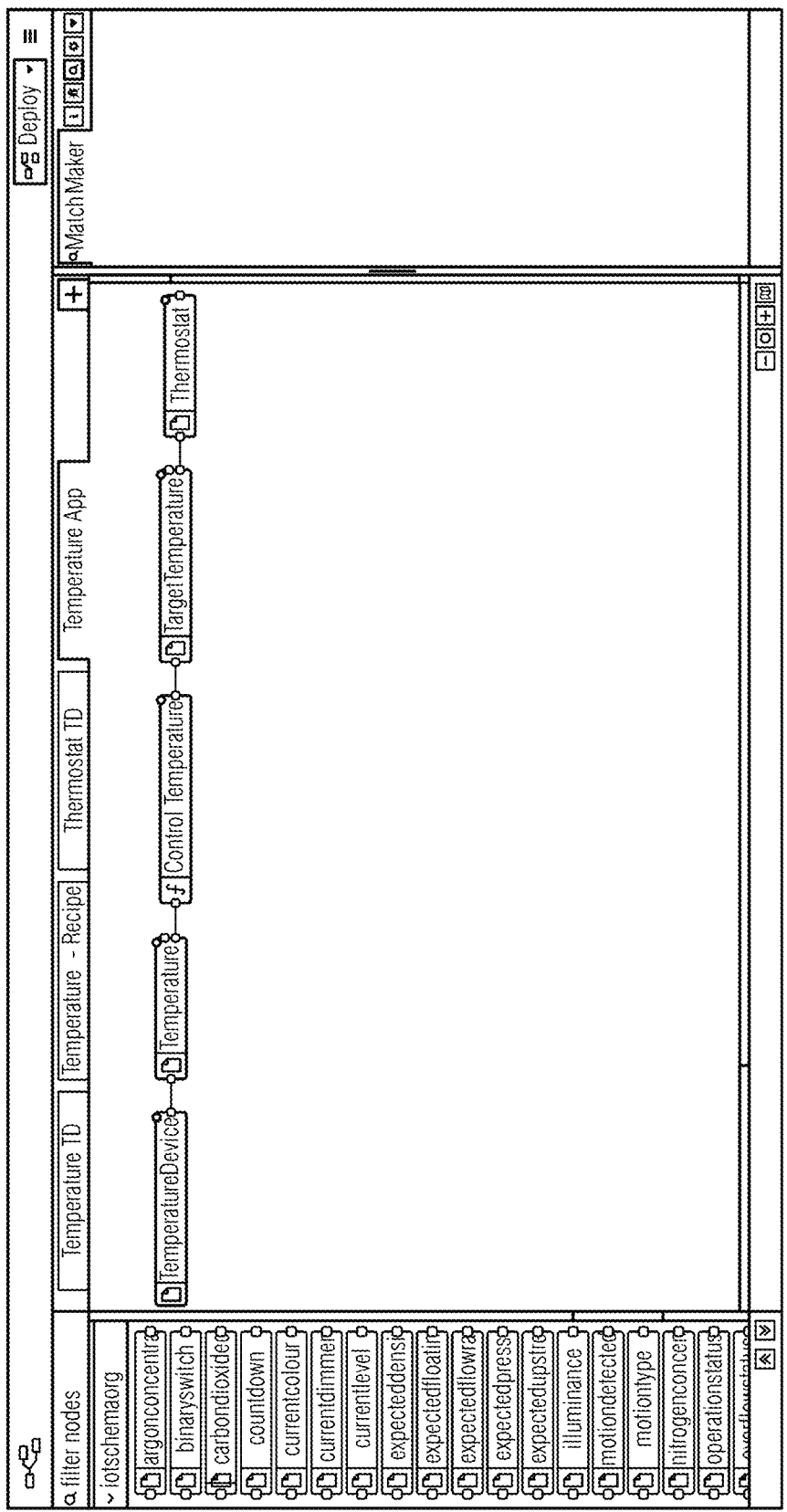
FIG. 7 depicts a graphical representation of an example of the composition unit in a fourth stage of development, wherein a composite interaction is designed as an application template in a second stage of development.

As to the example application, that is, an application to control the thermostat based on the temperature value, a user first selects temperature template and thermostat template as shown in FIG. 7. The temperature template and thermostat template are shown as entity icons »Temperature» and »Thermostat«, respectively. The user configures these entity icons by amending at least one attribute according to device specifications of the industrial entity and to define requirements of the interactions of the entity icons in order to run the application. In addition to the configuration parameters, a configuration of operation attributes such as to specifying REST operations may be necessary. REST operations may include data the aforementioned access operations, (e.g., GET operation), or triggering an action, (e.g., by a POST or PUT operation). After configuring or amending the entity icons, nodes of the entity icons are connected in order to describe the data flow between participating entity icons for to executing the composite interaction.

Figure 5:
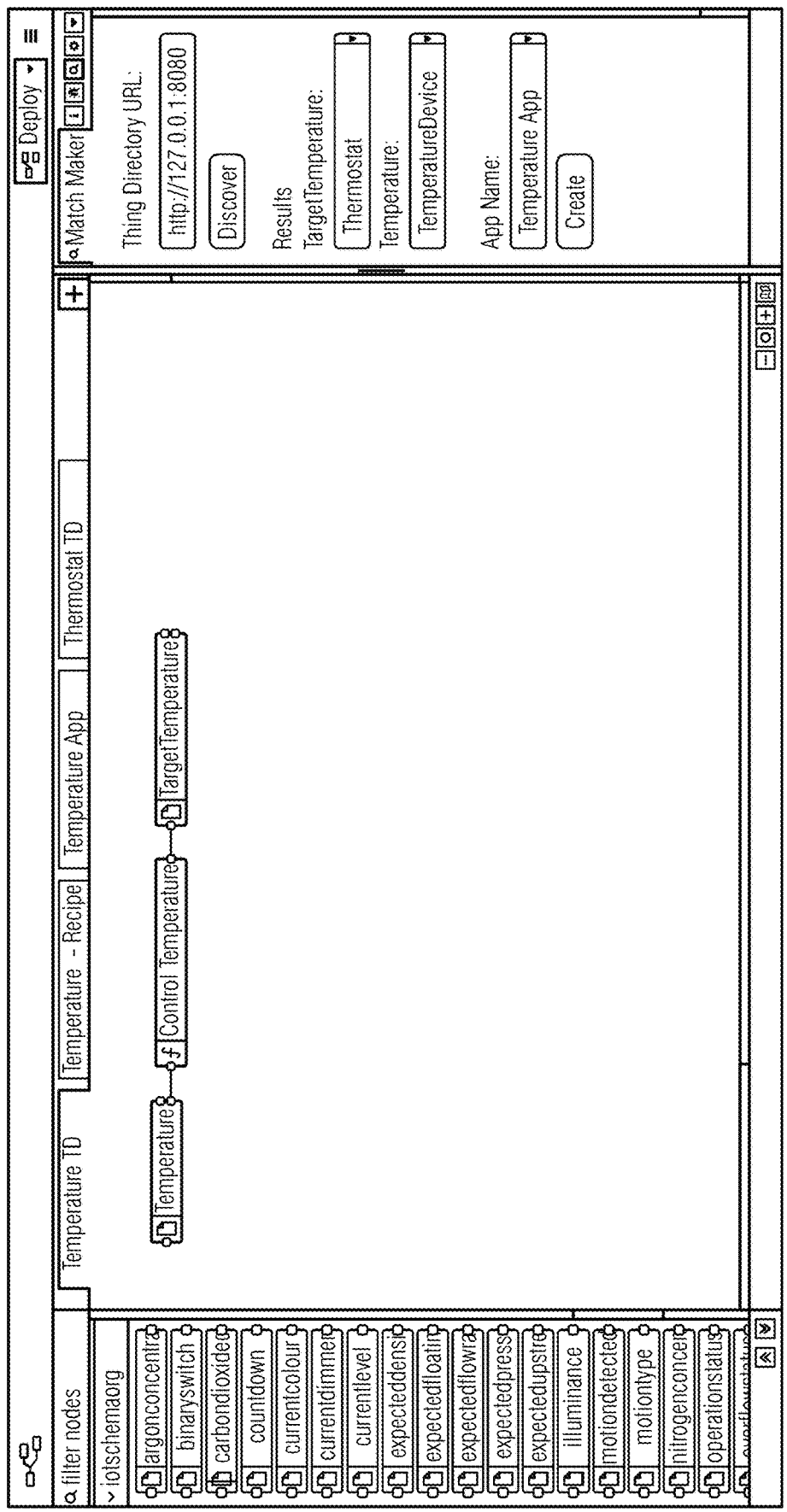
FIG. 5 depicts a graphical representation of an example of the composition unit in a fourth stage of development, wherein a composite interaction is designed as an application template in a first stage of development.

FIG. 5 shows the design of the composite interaction for the exemplary use case. After transforming the flow chart including the entity icons and their interconnected nodes into a semantical representation of the composite interaction to form the semantic description of the composite interaction as an application template, the application template may be serialized in JSON or XML or any RDF serialization format—such as JSON-LD, Turtle etc.—and finally saved in the semantic repository to discover, reuse or extend the application template or to implement the application.

Figure 6:
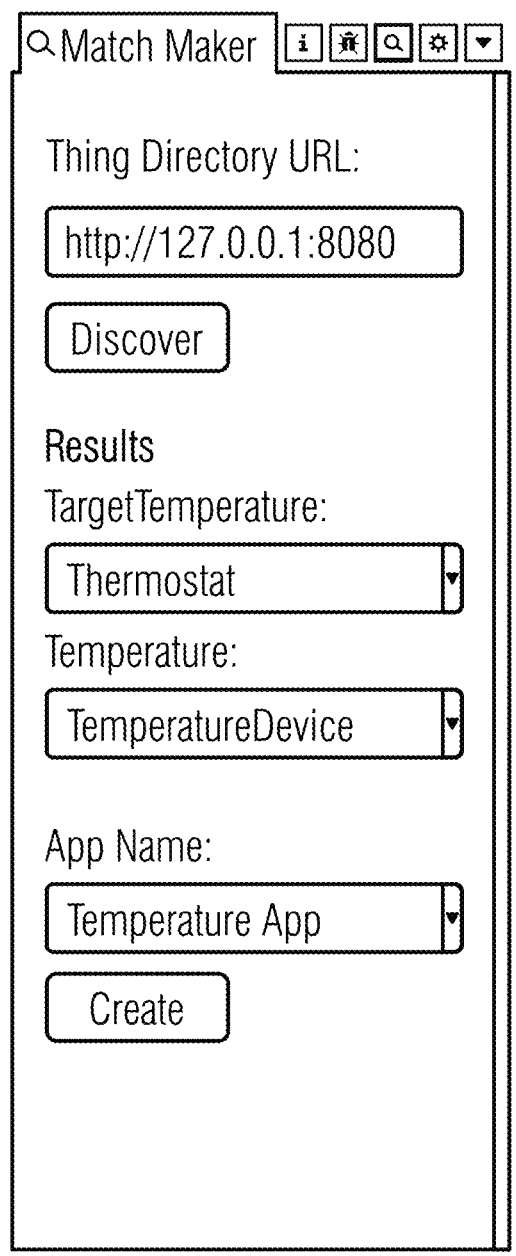
FIG. 6 depicts a graphical representation of an example of a control section of a Match Maker within the composition unit.

In the following, detailed acts for an automatically assisted development are described. According to the embodiments, the development process is mostly automated. A user interacts with the composition unit only for decision making. For this an entity icon entitled Match Maker as shown in FIG. 6 is introduced.

Match maker is a graphical representation of a machine reasoner, which interprets a semantic expression of the composite interaction and the semantic descriptions of industrial entities. With the help of the machine interpretable semantic descriptions, the machine reasoner automates the discovery of industrial entities that match to the requirements of a semantic configuration template.

To this end, the match maker includes a semantic reasoner for interpreting the semantic expression of the composite interaction and performing a semantic discovery of functional requirements of the composite interaction amongst the plurality of semantic descriptions of industrial entities stored in the industrial knowledge graph. After identifying at least one semantically similar semantic description the semantic reasoner provides, in response to user input, the at least one semantically similar semantic description as at least one entity icon corresponding to the semantically similar semantic description.

The user is assisted by the following acts to instantiate, configure, and deploy a composite interaction or an application from one or more templates such as: designing or discovering a required application template; using match maker to discover compatible industrial entities that fulfill the application requirements; instantiating the application using match maker; and/or deploying the application.

The application templates created in a previous act are stored in an industrial knowledge graph. A user may discover a required template from the repository. The user then uses the match maker and configures the template to the semantic repository where the semantic descriptions of the things are stored.

The match maker takes the application template as input, generates queries to discover compatible industrial entities required for the application, and eventually discovers the industrial entities matching the application requirements. That is, the compatibility between an application and industrial entities is automatically checked or validated.

In the exemplary use case, the match maker automatically discovers the temperature sensor and thermostat devices. This is possible due to the usage of standardized semantic models, which provide standardized interface of an industrial entity. Using the match maker, the user is able to select desired industrial entities amongst the discovered industrial entities as shown in FIG. 5. After this act, the user may simply instantiate the application »Temperature App« with selected industrial entities by activating a button »Create« as shown in FIG. 6.

FIG. 7 shows the application instantiated with the temperature sensor and thermostat devices according to the exemplary use case. This instance is automatically generated by considering the industrial entities selected by the user. After instantiating the application, the user may deploy it either on a cloud space or on an edge device, which is deployed on an industrial system or on a computer of the user.

The embodiments proposed herein provide a simplified configuration of an industrial entity and an application development using a visual programming environment. The concept is based on graphical representation of semantic models as configurable entity icons. An entity icon corresponding to a semantic configuration template acts as a template for an atomic capability of an industrial entity providing a configuration that is consistent with preconfigured solutions of the semantic model. The entity icon may be customized according to a device specification of the industrial entity by configuring one or more attributes according to the device specifications. The configuration act is guided and validated. One or more configured entity icons may be used to describe capabilities of an industrial entity or to create an IoT application template. Semantics and their graphical representation play the key role in the embodiments, thereby achieving one or more of the following advantages.

For example, one advantage is that a machine interpretable user interface of the composition unit allows for an interpretation of graphically represented semantic components such that the composition unit automates or at least assists complex application development tasks.

Another advantage is that enabling an automatic generation of graphical representations of semantic models allows for applying semantic reasoners for reasoning these graphical representations, e.g., when the user needs to connect one component with another one.

Another advantage is that graphically represented semantic configuration templates enable a non-semantic expert to easily configure semantics of an industrial entity while generating a semantic description of the industrial entity. Another advantage is that application developers or web developers may easily design interoperable applications without binding them to particular entities belonging to a limited ecosystem.

Another advantage is that the embodiments may be applied to any semantic model (e.g., OPC-UA companion standard, iot.schema.org, etc.), any standard (e.g., W3C WoT, MindSphere, OPC-UA), any device (e.g., industrial devices, building automation devices, etc.), any backend, format, etc.

Another advantage is that the embodiments may be integrated in any existing IoT tool or engineering tool e.g., TIA portal, Node-RED, Mendix, MindSphere, 4diac, etc.

Another advantage is that the embodiments allow a high degree of re-usability for composite interactions or applications because they may be instantiated with industrial entities from diverse ecosystems.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for generating a semantic description of a composite interaction, the method comprising:

storing a plurality of semantic configuration templates in an industrial knowledge graph, each configuration template of the plurality of semantic configuration templates semantically representing at least one interaction;

loading, by a composition unit, at least one semantic configuration template of the plurality of semantic configuration templates as an entity icon corresponding to the at least one semantic configuration template, parsing at least one semantically expressed interaction of the at least one semantic configuration template and providing access to the at least one semantically expressed interaction by at least one interconnectable node assigned to the entity icon;

assembling, in the composition unit, a data flow chart by interconnecting, in response to user input, interconnectable nodes to define the composite interaction;

interpreting, by a semantic reasoner, a semantic expression of the composite interaction, performing a semantic discovery of functional requirements of the composite interaction amongst a plurality of semantic descriptions of industrial entities in the industrial knowledge graph, identifying at least one semantically similar semantic description, and providing, in response to user input, the at least one semantically similar semantic description as at least one entity icon corresponding to the semantically similar semantic description;

transforming the data flow chart including the entity icons and the interconnected nodes into a semantical representation of the composite interaction to form the semantic description of the composite interaction; and storing the semantic description of the composite interaction in the industrial knowledge graph.

2. The method of claim 1, further comprising:

parsing the at least one semantically expressed interaction of the at least one semantic configuration template and accessing at least one attribute of the at least one semantically expressed interaction to the user input; and amending, in response to the user input, the at least one attribute according to device specifications of an industrial entity to form the semantic description of the composite interaction.

3. The method of claim 1, wherein the plurality of semantic configuration templates is expressed by a Thing Description according to specifications of a World Wide Web Consortium, an iot.schema.org capability model, an OPC UA node set according to specifications of an Open Platform Communications Unified Architecture, or a cloud data model including a MindSphere Asset model, or combinations thereof.

4. The method of claim 1, wherein the semantic description of the composite interaction is expressed by a Shape Constraints Language according to a Resource Description Framework format, a Shape Expressions Language, OWL axioms of Web Ontology Language, or combinations thereof.

5. The method of claim 1, wherein a graphical user interface of the composition unit visualizes one entity icon of the entity icons by a graphical function block, and wherein attributes of the entity icon are accessed for user input by control elements assigned to the entity icon.

6. The method of claim 1, wherein a graphical user interface of the composition unit visualizes at least one interconnectable node of the interconnectable nodes as a visual assignment to one entity icon of the entity icons, and wherein two interconnectable nodes of the interconnectable nodes are interconnected by drawing a graphical interconnection line on the graphical user interface.

7. A composition unit for generating a semantic description of a composite interaction, the composition unit comprising:

an interface to an industrial knowledge graph configured to store a plurality of semantic configuration templates, wherein each configuration template of the plurality of semantic configuration templates semantically represents at least one interaction;

a composition panel configured to:
   load at least one semantic configuration template as an entity icon corresponding to the at least one semantic configuration template;
   parse at least one semantically expressed interaction of the at least one semantic configuration template;
   provide access to the at least one semantically expressed interaction by at least one interconnectable node assigned to the entity icon; and
   assemble a data flow chart by interconnecting, in response to user input, at least two interconnectable nodes to define the composite interaction;

a semantic reasoner configured to:
   interpret a semantic expression of the composite interaction;
   perform a semantic discovery of functional requirements of the composite interaction amongst a plurality of semantic descriptions of industrial entities in the industrial knowledge graph;
   identify at least one semantically similar semantic description; and
   provide, in response to user input, the at least one semantically similar semantic description as at least one entity icon corresponding to the semantically similar semantic description; and a transformation unit configured to:
   transform the data flow chart including the entity icons and the interconnected nodes into a semantical representation of the composite interaction to form the semantic description of the composite interaction; and
   assign the semantic description of the composite interaction to the interface to the industrial knowledge graph.

* * * * *